Patented Dec. 13, 1932

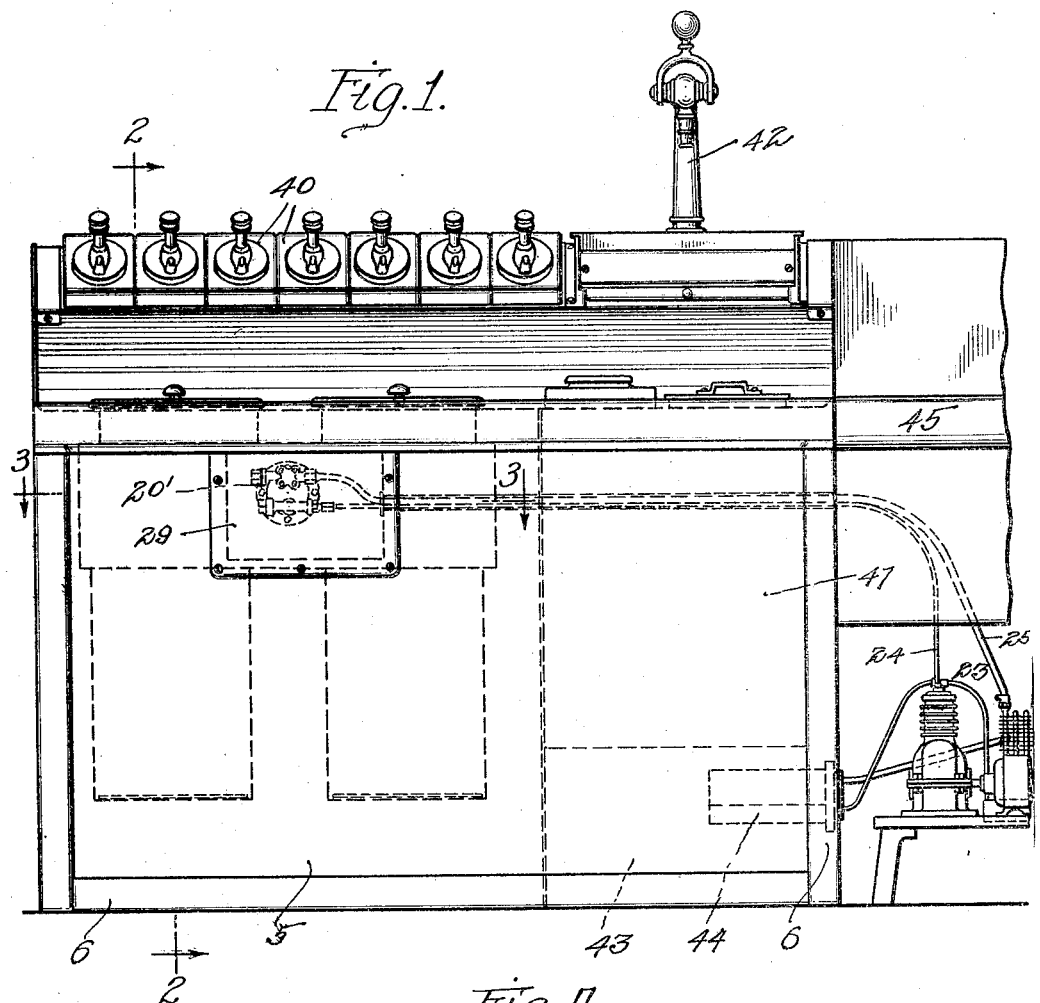
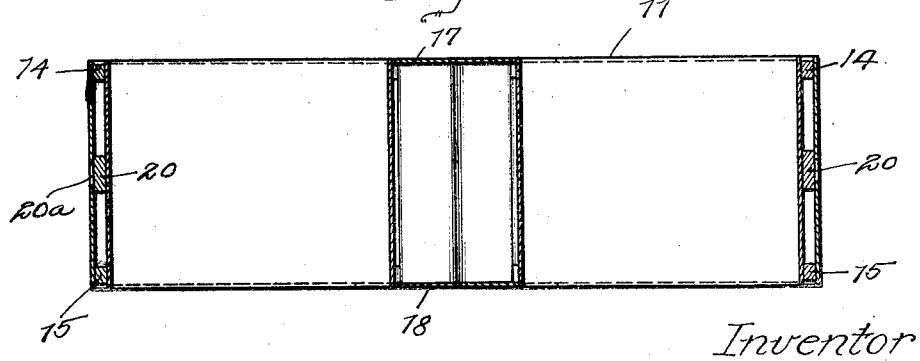

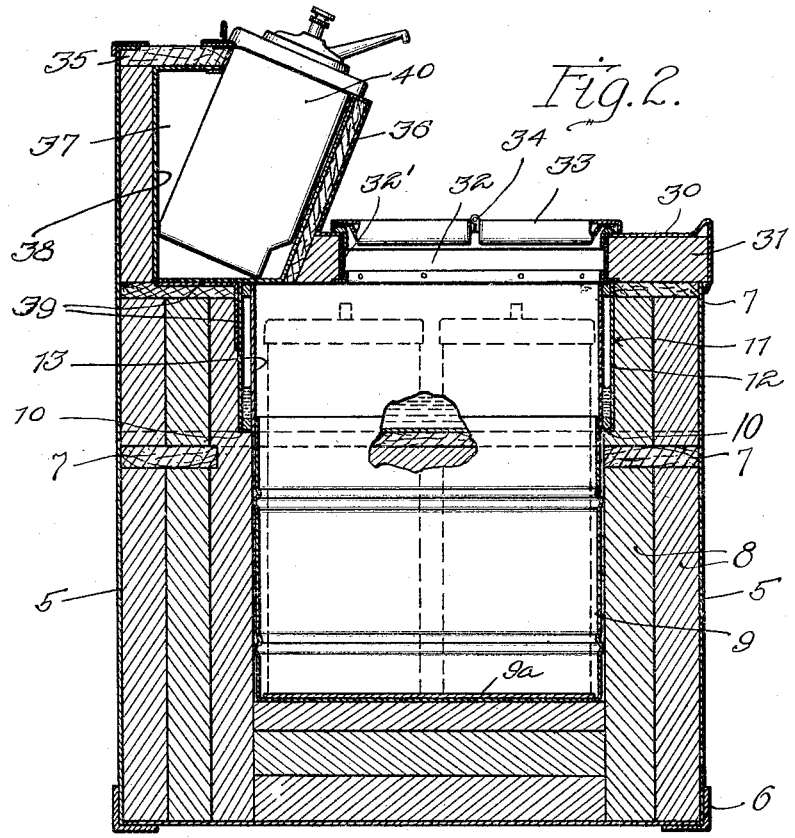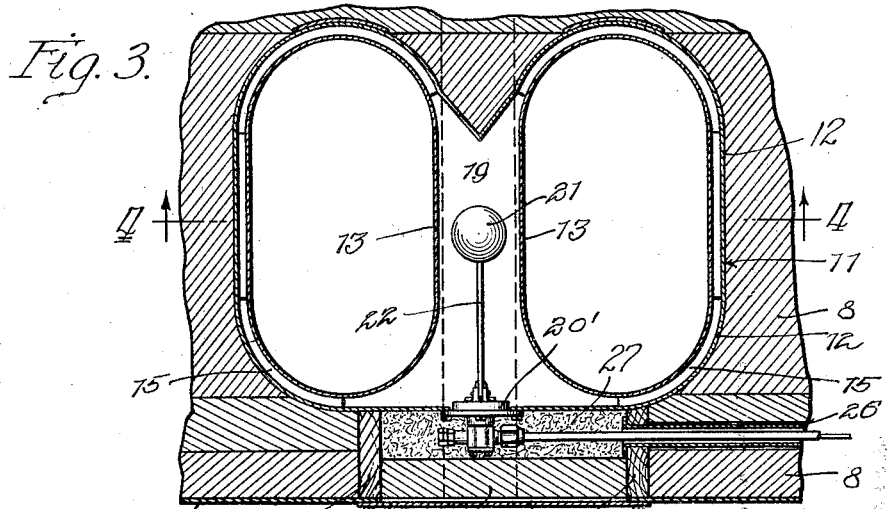

1,890,641

UNITED STATES PATENT OFFICE

WILLIAM F. DELZER, OF MILWAUKEE, WISCONSIN, ASSIGNOR TO WESTERN SPECIALTY COMPANY, OF MILWAUKEE, WISCONSIN, A CORPORATION OF WISCONSIN

SODA FOUNTAIN AND ICE CREAM CABINET

Application filed April 10, 1929. Serial No. 353,981.

My invention relates to mechanical refrigeration, particularly to a mechanically refrigerated ice cream cabinet, and more specifically to a mechanically refrigerated combined soda fountain and ice cream cabinet.

It has been the practice, in such equipments, to surround the ice cream container compartment or compartments with a brine tank containing refrigerating coils in which the refrigerant is expanded as is well known in the art.

In such structures, the brine tanks require considerable space and the over-all dimensions of soda fountains and ice cream cabinets, built according to this prevailing practice, are governed largely by the necessary sizes of these tanks.

According to my invention, I provide a refrigerant container in the nature of a "boiler", itself defining the upper portion of the ice cream container compartment. Furthermore, I provide means whereby a syrup container compartment is appropriately cooled from this refrigerant container.

The employment of my invention results in an efficient apparatus and in a compact structure, which may be inexpensively manufactured and which is not readily subject to disorder.

My invention is illustrated in the accompanying drawings in which,

Figure 1 is an elevational view of the server's side of my improved soda fountain and ice cream cabinet;

Figure 2 is a vertical cross sectional view taken on the plane of the line 2—2 of Figure 1 and looking in the direction indicated by the arrows;

Figure 3 is a partial horizontal sectional view taken on the plane of the line 3—3 of Figure 1 and looking down; and Figure 4 is a vertical longitudinal sectional view of the refrigerant container per se taken on the plane of the line 4—4 of Figure 3 and looking in the direction indicated by the arrows.

The structure comprises a main cabinet, in which the ice cream container and other compartments are located, and a super-structure for soda fountain equipment.

The cabinet, as a whole, is formed by a sheet metal housing 5, braced by angle irons 6 and an internal skeleton wood frame work 7. The cabinet thus formed is lined with layers of cork 8, 8 which leave recesses forming the compartments now to be referred to.

Two recesses are formed for the reception of sheet metal receptacles 9, 9 which constitute the lower portions of the ice cream container compartments. The recesses which receive these receptacles are enlarged toward the top, forming shoulders 10, 10 and are there combined into one to form a single space for the reception of the separable refrigerant container 11 which rests on these shoulders. This refrigerant container is shown in detail in Figures 3 and 4 and it will be seen that it is broadly in the form of two adjacent joined annuli, thus making a compartment in the form of a figure 8. Each encircling portion of this refrigerant container telescopes at its bottom with the upper margin of one of the receptacles 9, as clearly illustrated in Figure 2, and a crosspiece 7a of the skeleton wood frame work may be so positioned as to take part in the appropriate support of this refrigerant container.

The refrigerant container 11 is defined by the outer wall 12, the inner walls 13, 13 of sheet metal, the upper metal strips 14, 14, the lower metal closing strips 15, 15, the upper closing plate 17, and the lower closing plate 18, of sheet metal. The junction between the two annuli is enlarged, as indicated by 19, for a purpose which will appear presently. Auxiliary metal closing strips 20, appropriately spacing the outer and inner walls are welded in place, the outer wall being provided with openings 20a to permit of this welding in the course of assembly.

A valve housing 20' is mounted in the front portion of the outer wall 12 of the refrigerant container 11. This device provides for the feed of the refrigerant, such as sulphur dioxide, in liquid form, to the refrigerant container, this feed being automatically controlled by the float 21, the arm 22 of which is appropriately connected with the valve. My invention is not concerned with the specific form of this valve mechanism, which is well known, and it therefore suffices to say that the liquid feed through it is controlled by the level of the liquid in the refrigerant container and that the expanded gas is returned through the housing from the refrigerant container to the refrigerating unit. This refrigerating unit, which may be of any standard form, is shown at 23 in Figure 1, the piping which conveys the refrigerant in liquid form, from the unit to the float controlled valve, being indicated at 24. The piping which conveys the expanded gas from the valve housing back to the refrigerating unit is indicated at 25 and these pipe lines are carried through tubing 26 lodged in the cork lining of the cabinet, as clearly indicated in Figures 1 and 3. So that the valve housing 20' may be readily accessible, it is disposed in an insulated compartment of its own, as illustrated in Figure 3. This compartment is formed by vertical members 7b, 7b of the wooden frame work and is filled, first, with hair felt 27, and then with a cork layer 28, this special compartment being closed by a removable cover 29.

It will now be clear that, since the refrigerant container forms the upper portions of the two ice cream container compartments, the cooling medium is applied simply to the upper zones of these compartments. The purpose of this is to maintain uniformity in the cooling of these compartments. It is the upper portions of these compartments which are frequently directly exposed to the outside temperature and therefore, if these zones are kept sufficiently cool, the lower portions will take care of themselves, since they are more remote from the outside temperature and since the cool air moves downwardly.

The cabinet is closed, at the top, by a top member formed by a sheet metal housing 30 enclosing suitable insulating material 31, this cover being provided with openings 32, 32 for access to the ice cream container compartments. Each of these openings 32 is lined with a fibre "frost breaker" 32' and is adapted to be closed by the removable cover 33 made of two portions hinged together at 34. The entire cover is removed for the purpose of stowing the ice cream containers, indicated in dotted lines in Figure 2, in the compartment, and the front half of the cover is swung open in serving ice cream therefrom. In order to protect the bottom of the receptacles 9, 9 against injury by the ice cream, I place sheets 9a of heavier metal in the bottom thereof.

The super-structure is formed by extending the front of the cabinet upwardly, including a layer of insulation, as shown in Figure 2, and a counter strip 35 of wood is mounted lengthwise upon this extension. This arrangement, with the lengthwise front strip 36 of wood, forms the syrup container compartment 37.

This compartment is lined with sheet metal as indicated at 38, and a strip of sheet metal 39, of angle formation, has one web thereof placed against the bottom part of this lining and the other web thereof directly against the adjacent portion of the outer wall 12 of the refrigerant container 11. By this means, the syrup container compartment is effectively cooled; moisture being present, frost readily forms in the bottom thereof. The syrup containers 40, 40 fit in this syrup container compartment, as indicated in Figures 1 and 2.

I also provide a compartment 41, in the cabinet, for bottled goods, crushed fruit containers and the like, and, if desired, coils through which soda water is led from the source of supply to the spigot 42, thus cooling the soda water on its way to the spigot. Below the compartment 8, in space otherwise waste, I provide the water compartment 43 in which a standard evaporator 44 may be disposed, this evaporator being connected with the refrigerating unit 23 as is well known in the art. I also provide, at the side of the cabinet, a convenient washboard 45 where suitable glass and dish washing facilities may be provided.

My invention provides an apparatus which is not subject to leakages and it is productive of a substantial saving in cost of operation and temperature maintenance.

I claim:—

1. In combination, an insulated receptacle, an annular refrigerant container disposed co-axially with said receptacle and telescoping at its bottom with the upper margin thereof to form a cooled compartment, and means for feeding a refrigerant directly into said container.

2. In a refrigerating apparatus, a receptacle, a separate annular refrigerant container disposed co-axially and united with said receptacle, means for feeding a refrigerant in liquid form to said container, and means for controlling said feed according to the level of said liquid in said container.

3. In refrigerating apparatus, a container comprising two annular portions disposed in spaced relation on parallel axes and joined together, means for feeding a refrigerant in liquid form thereto for expansion therein, and a receptacle disposed co-axially with and supplementing each of said annular portions to form a cooled compartment.

4. In refrigerating apparatus, a container comprising two annular walls disposed in spaced relation on parallel axes, an envelope for said walls, means for feeding a refrigerant in liquid form to said container for expansion therein, a receptacle disposed co-axially with and supplementing each of said annular walls to form a cooled compartment, and means insulating said container and receptacles.

5. In a refrigerated soda fountain and ice cream cabinet, a main body portion having outer walls and having a plurality of receptacles for the reception of ice cream containers, and heat insulating material interposed between said outer walls and said compartments, said receptacles comprising upper and lower separable parts, said upper part being in the form of a tight container for receiving a liquid refrigerant for expansion therein.

6. In a refrigerated soda fountain and ice cream cabinet, a main body portion having outer walls and having a plurality of receptacles for the reception of ice cream containers, heat insulating material interposed between said outer walls and said receptacles, said receptacles comprising a separable refrigerant container defining the upper walls of said receptacles, said refrigerant container being tight and adapted for expansion of a refrigerant therein.

7. In a refrigerated soda fountain and ice cream cabinet, a main body portion having outer walls and having a plurality of receptacles for the reception of ice cream containers, heat insulating material interposed between said outer walls and said receptacles, said receptacles comprising upper and lower separable parts, said upper part being in the form of a tight double walled enclosure for receiving a refrigerant for expansion therein, an auxiliary compartment positioned above said main body portion and having an inner metal lining, heat conducting means connecting said lining with one of the walls of said enclosure.

8. In a combined soda fountain and ice cream cabinet, a main body portion providing an insulated compartment, a receptacle in said compartment, a separable refrigerant container supplementing said receptacle, means for feeding a refrigerant in liquid form directly to said container for expansion therein, an auxiliary compartment, a metal lining for said auxiliary compartment, and a sheet metal member directly connecting said lining and said container for heat conductivity.

9. In an ice cream cabinet, a main body portion providing an insulated compartment, a tight annular container lining the upper part of said compartment, valve mechanism mounted in the wall of said annular container and providing for the introduction of a liquid refrigerant to and the exit of expanded refrigerant from said annular container, and a float connected with said valve mechanism and located in an enlargement in said annular container.

10. In an ice cream cabinet, a main body portion providing two insulated compartments, a tight container comprising two annular portions joined together and forming an enlargement at their junction, each annular portion lining the upper part of one of said compartments, valve mechanism mounted in the wall of said container at said junction and providing for the introduction of a liquid refrigerant to and the exit of expanded refrigerant from said container, and a float connected with said valve mechanism and located in said enlargement.

In witness whereof, I hereunto subscribe my name this 6th day of April 1929.

WILLIAM F. DELZER.